United States Patent [19]
Belart

[11] Patent Number: 4,819,433
[45] Date of Patent: Apr. 11, 1989

[54] HYDRAULIC BRAKE SYSTEM

[75] Inventor: Juan Belart, Walldorf, Fed. Rep. of Germany

[73] Assignee: ITT Industries, Inc., New York, N.Y.

[21] Appl. No.: 502,913

[22] Filed: Jun. 10, 1983

[30] Foreign Application Priority Data

Aug. 13, 1982 [DE] Fed. Rep. of Germany ....... 3230082

[51] Int. Cl.⁴ .............................................. B60T 13/00
[52] U.S. Cl. .............................. 60/547.1; 137/505.18
[58] Field of Search ................. 60/547.1, 555, 556, 60/548; 137/505.18, 495

[56] References Cited

U.S. PATENT DOCUMENTS

| | | | |
|---|---|---|---|
| 404,504 | 6/1889 | Ross | 137/505.18 |
| 2,997,851 | 8/1961 | Trubert et al. | 92/129 |
| 4,034,566 | 7/1977 | Suketomo et al. | 60/548 |
| 4,215,715 | 8/1980 | Raskin | 137/505.18 |
| 4,244,278 | 1/1981 | Belart et al. | 60/547.1 |
| 4,254,623 | 3/1981 | Dauvergne | 60/548 |
| 4,279,271 | 7/1981 | Neff | 137/505.18 |
| 4,444,440 | 4/1984 | Farr | 60/548 |
| 4,482,190 | 11/1984 | Burgdorf et al. | 303/6 R |

FOREIGN PATENT DOCUMENTS 3218194 11/1983 Fed. Rep. of Germany .

Primary Examiner—Abraham Hershkovitz
Attorney, Agent, or Firm—James B. Raden

[57] ABSTRACT

The hydraulic brake system having at least one wheel brake is adapted to be pressurized by a master brake cylinder actuated by a hydraulic power booster. An auxiliary pressure is adjustable in a pressure chamber of the hydraulic power booster by means of a brake valve. Interposed between an auxiliary pressure source and the brake valve is a pressure-reducing valve that is controllable by the auxiliary pressure and contains a valve controlling a passageway, the valve being acted upon by the auxiliary pressure to open the passageway. To simplify the construction of the pressure-reducing valve, the closure member of the valve is exposed to the reduced pressure in the pressure-reducing valve such that a force related to the valve seat surface will be exerted on the closure member in the closing direction of the passageway of the pressure-reducing valve.

2 Claims, 1 Drawing Sheet

HYDRAULIC BRAKE SYSTEM

BACKGROUND OF THE INVENTION

The present invention relates to a hydraulic brake system, in particular for automotive vehicles, comprising at least one wheel bake adapted to be pressurized by a master brake cylinder, a hydraulic power booster for the actuation of the master brake cylinder, an auxiliary pressure which is adjustable in a pressure chamber of the hydraulic power booster by means of a brake valve, and a pressure-reducing valve interposed between the auxiliary pressure source and the brake valve controllable by the auxiliary pressure and having a valve which is adapted to be acted upon by the auxiliary pressure in the opening direction.

This type of brake system has been described in the prior German patent application P No. 32 18 194.9. The brake system according to this prior art comprises a tandem master cylinder which serves to pressurize two brake circuits. The tandem master cylinder is actuatable in turn by a hydraulic power booster which is substantially composed of a booster piston guided in a cylinder bore and of a brake valve arranged in the booster piston. The booster piston is provided with a circumferential groove at its outer peripheral surface so that an annular chamber will be provided in the hydraulic power booster which communicates via a pressure-reducing valve with an auxiliary pressure source. Upon application of the brake pedal, the brake valve will assume a position in which an auxiliary pressure is metered into the pressure chamber of the hydraulic power booster and displaces the booster piston in the cylinder bore of the hydraulic power booster upon attainment of a specific pressure level.

At the same time, the auxiliary pressure adjusted in the pressure chamber of the hydraulic power booster will be fed back to the pressure-reducing valve. As a result thereof the pressure at the outlet of the pressure-reducing valve and the pressure in the circumferential annular chamber of the booster piston will rise. Thus, the pressure-reducing valve serves to ensure that the pressure supplied to the booster piston will always be adjusted to the pressure requirement in the pressure chamber and to the actuating position. This will afford the advantage that the ring seals sealing the booster piston are not constantly exposed to the high pressure of the auxiliary pressure source so the high actuating forces and breakaway torques at the booster piston will be precluded to a large degree or at least reduced.

It has to be regarded at less favorable in the brake system described that the pressure-reducing valve is of relatively complicated construction. For example, the closure member of the pressure-reducing valve is part of a stepped piston which is guided in a stepped bore in a sealed relationship thereto. The reduction ratio of the pressure-reducing vale is predetermined by the dimensions of the effective surfaces of the stepped piston alone and cannot be adjusted retrospectively.

SUMMARY OF THE INVENTION

It is, therefore, an object of the present invention to simplify the construction of the pressure-reducing valve described hereinabove in order to reduce costs.

A feature of the present invention is the provision of a hydraulic brake system for automotive vehicles comprising at least one wheel brake circuit pressurized by a master brake cylinder actuated by a hydraulic power booster, the power booster having a pressure chamber in which an auxiliary pressure is adjustable by a brake valve in the power booster; an auxiliary pressure source; and a pressure-reducing valve having a valve seat and a a valve closure member defining a valve passage therein, the pressure-reducing valve being connected between the auxiliary pressure source and the brake valve and to the pressure chamber to enable the auxiliary pressure to act on said closure member in a first direction to open the valve passage and to expose the closure member to reduced pressure of the pressure-reducing valve such that a force is exerted on the closure member in a second direction to close the valve passage, the force being related to a surface of the valve seat and the reduced pressure. This arrangement creates a straightforward and functionally reliable pressure-reducing valve in which a stepped piston and a bore receiving the stepped piston can be dispensed with. Furthermore, housing ports and a pressure line or a pressure fluid channel within the pressure-reducing valve will be superfluous.

An advantageous improvement upon the subject matter of the present application will be attained, if the closure member of the pressure-reducing valve is in addition springloaded in the opening direction. This arrangement offers the possibility of adjusting the reduction ratio of the pressure-reducing valve retrospecitvely. Besides, the adjustability of the spring preload permits setting exactly the precise opening pressure of the pressure-reducing valve after its manufacture.

In a favorable improvement of the pressure-reducing valve, a piston which is adapted to be acted upon by the auxiliary pressure is guided in a cylinder bore of the pressure-reducing valve in a sealed manner, the piston being coupled to the closure member by means of a tappet of smaller diameter and forming with the cylinder bore an annular chamber which is connected to the auxiliary pressure source. In the inventive pressure-reducing valve, in case of need, the cylinder bore can be a stepped bore and the piston can be guided in the enlarged bore portion. Such a construction enables the closure member of the pressurereducing valve to lift off of its seat in the presence of lower auxiliary pressures and increases the pressure at the pressure-reducing valve. This renders the pressure-reducing valve as a whole more sensitive. It is another advantage of the stepped bore that the reduced pressure will be adapted to the auxiliary pressure more quickly in the event of dynamic actions. This is the case with panic stops when the vehicle driver tends to accomplish the brake's full applied position as fast as possible.

Unless the pressure-reducing valve has to be installed in the automotive vehicle separate of the booster/mastercylinder unit because of lack of mounting space, it will be expedient to have the pressure-reducing valve integrated into the housing of the master brake cylinder and/or into that of the hydraulic power booster. There will result a considerable simplification of the assembly in this case.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENT

Figure 1:
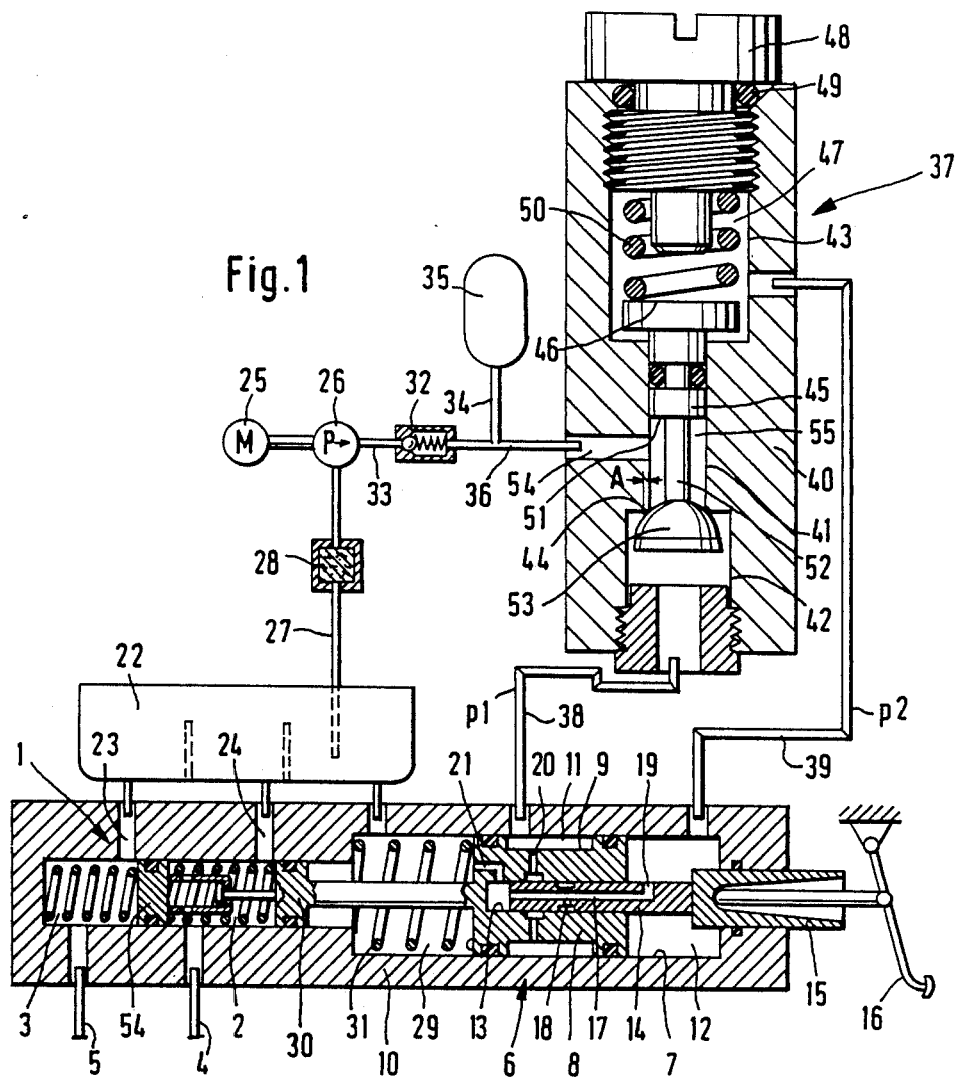
FIG. 1 is a longitudinal cross sectional view of a hydraulic brake system in accordance with the principles of the present invention.

Parts that correspond to each other have been assigned like reference numerals.

FIG. 1 shows a hydraulic dual-circuit brake system comprising a tandem master cylinder 1. Brake circuits 4 and 5 branch off from working chambers 2 and 3, respectively, of the tandem master cylinder 1 to the nonillustrated wheel brake cylinders of an automotive vehicle. The tandem master cylinder 1 is actuatable by a hydraulic power booster 6 which, in turn, comprises a booster piston 8 guided in a housing bore 7. Booster piston 8 contains on part of its peripheral surface a radial groove 9 which forms a circumferential annular chamber 11 with the housing 10. The right-hand end surface of booster piston 8, when viewing FIG. 1, defines a pressure chamber 12.

Booster piston 8 contains an axial bore 13 in which a control slider 14 is guided in a self-sealing manner. Controls slider 14 is a via an actuating piston 15 in communication with a brake pedal 16 and accommodates an axial channel 17 as well as two radial channels 18 and 19. Booster piston 8 also contains a radial channel 20 which extends from the inner circumferential annual chamber 11 radially to axial bore 13 of booster piston 8. Another pressure-fluid channel 21 is disposed in booster piston 8 enabling axial bore 13 to communicate with an unpressurized reservoir 22 via chamber 29.

Unpressurized reservoir 22, is on the one hand, in communication with the feed bores 23 and 24 of tandem master cylinder 1, while, on the other hand, it acts as reservoir for a pressure-fluid pump 26 driven by a motor 25. For this purpose, a pressure-fluid line 27 extends from unpressurized reservoir 22 via a filter element 28 to the pressure-fluid pump 26. In addition, the unpressurized reservoir 22 is connected with a chamber 29 which is defined basically by the left-hand surface of booster piston 8, when viewing FIG. 1, and by the master cylinder piston 30 assigned to the first brake circuit 4. A compression spring 31 is arranged in chamber 29 for resetting booster piston 8. The outlet of the pressure-fluid pump 26 is connected to a pressure accumulator 35 via a check valve 32 and pressure-fluid lines 33 and 34. Connected to pressure accumulator 35 via another pressure line 36 is a pressure-reducing valve 37 which, via a pressure-fluid line 38, has a connection to the circumferential annular chamber 11 of hydraulic power booster 6 and, in addition, communicates with pressure chamber 12 of hydraulic power booster 6 via a pressure-fluid line 39.

The pressure-reducing valve 37 includes a housing 40 with a centric axial bore 41. Centric axial bore 41 has on both ends two enlarged portions 42 and 43, with the bore step at the transition to bore portion 42 being constructed as valve seat 44. Guided in the centric axial bore 41 is a piston 45 which projects with its upper end surface 46, when viewing FIG. 1, into a chamber 47. Chamber 47 in the enlarged bore portion 43 is closed by a screw 48 and a ring seal 49. Chamber 47 accommodates a compression spring 50 which is supported on screw 48, on the one hand, and on the end surface 46 of piston 45, on the other hand.

The end surface of the 45 remote from the compression spring 50 carries a tappet 52 having a smaller diameter than the bore portion 41 and is at its lower end, when viewing FIG. 1, constructed to form an approximately hemispherical valve closure member 53 which, in cooperation with the valve seat 44, forms a valve passage. The chamber in the enlarged bore portion 42 which receives valve closure member 53 communicates with pressure-fluid line 38.

The mode of operation of the brake system illustrated in FIG. 1 will be described in more detail hereinbelow. The starting point of a braking operation is the condition of brake release in which no force is exerted on the brake pedal 16. It shall be assumed furthermore that the pressure accumulator 35 will at first be unpressurized, such as may occur, for instance, after an automotive vehicle has stood still for a long period of time. Under these conditions, booster piston 8 is placed in an end position to the right, when viewing FIG. 1, due to the force effect of restoring spring 31. When putting the automotive vehicle in operation, the motor 25 starts, thus causing pressure-fluid pump 26 that is mechanically coupled to motor 25 to suck pressure fluid from unpressurized reservoir 22 and to supply it via check valve 32 to pressure accumulator 35. The pressure of pressure accumulator 35 is supplied further more via a channel 54 of pressure-reducing valve 37 into a circumferential annular chamber 55 of pressure-reducing valve 37, the latter chamber being formed by tappet 52 in centric axial bore 41. The rising pressure in circumferential annular chamber 55 of pressure-reducing valve 37 causes displacement of piston 45 in opposition to the force of compression spring 50 upwardly, when viewing FIG. 1, until finally the valve closure member 53 is in abutment on the valve seat 44. Under these operating conditions, chamber 47 in enlarged bore portion 43 will be unpressurized, since chamber 47 is via pressure line 39 connected to pressure chamber 12 of hydraulic power booster 6 and pressure chamber 12 is unpressurized in the brake's release position.

Figure 3:
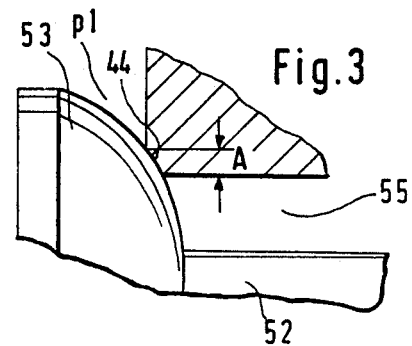
FIG. 3 is a segment of the pressure-reducing valve of FIG. 1 on an enlarged scale.

After valve closure member 53 has moved into abutment on valve seat 44, a pressure p1 will prevail in the circumferential annular chamber 55 and in the pressure-fluid line 38, which pressure is basically dependent on the effective surface A of the valve seat 44 and on the force of compression spring 50. The effect of the sealing surface of valve seat 44 has been clarified in FIG. 3. The force component in the closing direction which acts on piston 45 and is defined by the pressure p1 is consequently determined by the product of the pressure p1 and the annular surface A of the valve seat 44. In the present example, the annular surface A is dimensioned so as to bring about a pressure p1 of 35 bar at the outlet of pressure-reducing valve 37 and in the pressure-fluid line 38 in the brake's release position, i.e. with chamber 47 unpressurized. This reduced pressure p1 will likewise prevail in circumferential annular chamber 11 of hydraulic power booster 6.

With an actuating force acting on brake pedal 16, control piston 15 with control slider 14 will move to the left, when viewing FIG. 1, in relation to the booster piston 8, thus first causing closure of pressure-fluid channel 21 which is in communication with the unpressurized reservoir 22. Upon continued movement of control slider 14, radial channel 18 in control slider 14 will be moved into overlapping engagement with radial channel 20 in booster piston 8. Pressure fluid from circumferential annular chamber 11 will flow via radial channel 18, axial channel 17 and radial channel 19 into pressure chamber 12 of hydraulic power booster 6 and chamber 47 of pressure-reducing valve 37 will be pressurized via pressure-fluid line 39. By such pressurization of chamber 47 of pressure-reducing valve 37, a force will be exerted on piston 45 which is proportional to the effective surface of piston 45. This force acts on valve 44, 53 of pressure-reducing valve 37 in opening direction. Caused by the pressure p2 introduced into pressure chamber 12, booster piston 8 will finally displace to the left, when viewing FIG. 1, which results in a change in the position of booster piston 8 relative to control slider 14 and whereby a so-called breathing position will be attained in which the pressure-fluid channel 21 leading to unpressurized reservoir 22 is closed and radial channel 18 of controls slider 14 is moved to a minimal extent into overlapping engagement with radial channel 20 of booster piston 8. Corresponding to the movement of booster piston 8 of hydraulic power booster 6, also master cylinder piston 30, 54 of tandem master cylinder 1 will be displaced to the left, when viewing FIG. 1, as a result of which working chambers 2 and 3 decrease and a corresponding braking pressure will be generated in brake circuits 4 and 5 and in the wheel brakes connected to these brake circuits.

As a result of chamber 47 being pressurized by the pressure prevailing in pressure chamber 12 of hydraulic power booster 6, a new condition of equilibrium will occur at pressure-reducing valve 37 in which condition the pressure in pressure-fluid line 38 and in circumferential annular chamber 11 of hydraulic power booster 6 will be increased dependent upon the pressure in pressure chamber 12. Further displacement of control slider 14 to the left, when viewing FIG. 1, will disturb this condition of equilibrium again, the pressure in circumferential annular chamber 11 being increased in each case. With the aid of the maximum auxiliary force of hydraulic power booster 6, the valve 53, 44 of pressure-reducing valve 37 will be opened completely so that like pressures prevail in chambers 11, 12, 55 and 47. Upon release of brake pedal to their position shown in FIG. 1.

In the event of failure of the pressure in pressure accumulator 35, brake circuits 4 and 5 can be supplied with pressure without difficulty, though considerably increased force has to be applied on the pedal. In this case of disturbance, control piston 15 together with control slider 14 will be displaced in axial bore 13 of booster piston 8 until control slider 14 abuts on the bottom of axial bore 13. Upon further increase of the actuating force at brake pedal 16, booster piston 8 and master cylinder pistons 30 and 54 of tandem master cylinder 1 will be displaced to the left, when viewing FIG. 1, thereby causing brake circuits 4 and 5 to be subjected to pressure purely mechanically (without the aid of auxiliary energy). This emergency operation of the brake system will not be impaired by pressure-reducing valve 37.

Figure 2:
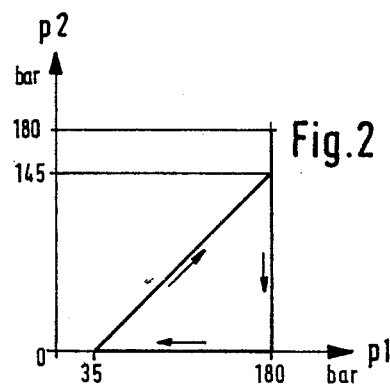
FIG. 2 is a pressure diagram illustrating the operation of the system of FIG. 1.

FIG. 2 shows the pressure distribution in chambers 11 and 12 of hydraulic power booster 6. It shall be assumed in this pressure diagram that pressure accumulator 35 is charged to its maximum value, for instance 180 bar. The annular surface A of valve seat 44 of pressure-reducing valve 37, compression spring 50 as well as the effective surface of piston 45 of pressure-reducing valve 37 are dimensioned such that in the inactive position (brake's release position), i.e. with pressure chamber 12 unpressurized, a pressure in the amount of 35 bar will be present in circumferential annular chamber 11. A soon as pressure fluid flows into pressure chamber 12 of hydraulic power booster 6, the pressure in chamber 47 of pressure-reducing bale 37 will also rise, which has as a consequence that the pressure in circumferential annular chamber 11 of hydraulic power booster 6 is constantly adapted to the pressure in pressure chamber 12, until there will be equality of pressure in circumferential annular chamber 11 and in pressure chamber 12 upon attainment of the brake's fully applied position. In the pressure diagram illustrated in FIG. 2, the pressure in circumferential annular chamber 11 of hydraulic power booster 6 is designated by p1 and the pressure in chamber 47 of pressure-reducing valve 37 and the pressure in pressure chamber 12 of hydraulic power booster 6 is designated by p2. The characteristic curve drawn in the pressure diagram illustrates the state of affairs described hereinabove.

While I have described above the principles of my invention in connection with specific apparatus, it is to be clearly understood that this description is made only by way of example and not as a limitation to the scope of my invention as set forth in the object thereof and in the accompanying claims.

I claim:

1. A hydraulic brake system for automotive vehicles comprising:

at least one wheel brake circuit pressurized by a master brake cylinder actuated by a hydraulic power booster, said power booster having a pressure chamber in which an auxiliary pressure is adjustable by a brake valve in said power booster;

an auxiliary pressure source; and a pressure-reducing valve having an approximately hemispherical valve closure member and a corresponding valve seat defining a valve passage therein, a spring and an adjusting bolt means acting thereon, said spring acting on said closure member to adjustably spring load said closure member in a first direction, said pressure-reducing valve further including a piston acted upon by said auxiliary pressure guided in a cylindrical bore and mechanically connected to said closure member by a tappet having a smaller diameter than said cylindrical bore, said tappet and said cylindrical bore forming an annular chamber in fluid communication with said auxiliary pressure source, said fluid communication taking place independent of the position of the brake valve, and pressure-reducing valve being connected between said auxiliary pressure source and said brake valve and to said pressure chamber to enable said auxiliary pressure to act on said closure member in said first direction to open said valve passage and to expose said closure member to reduced pressure of said pressure-reducing valve such that a force is exerted on said closure member in a second direction to close said valve passage, said force being related to the corresponding surfaces of said closure member and said valve seat and said reduced pressure.

2. A brake system according to claim 1, wherein said cylindrical bore is a stepped bore having a first enlarged diameter portion on one end thereof containing said piston and connected to said pressure chamber and a second enlarged diameter portion on the other end thereof containing said closure member and providing said reduced pressure.

* * * * *